A. BRANDES.
TREATMENT OF LIQUIDS.
APPLICATION FILED MAY 31, 1910.
Reissued Dec. 12, 1911.
13,338.
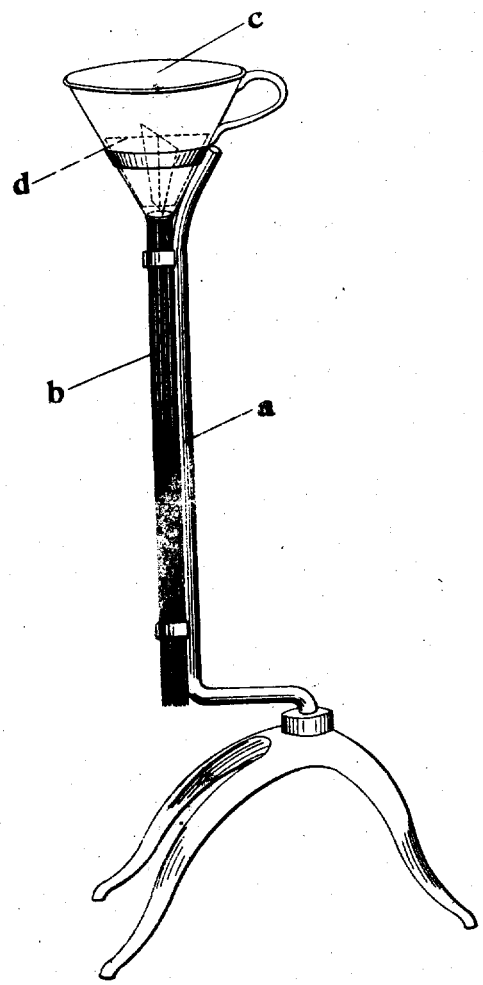
Witnesses—
J. Hobb
S. E. Dodge.
Inventor
August Brandes
by
M. E. [illegible]
Attorney.

UNITED STATES PATENT OFFICE.

AUGUST BRANDES, OF HANOVER, GERMANY, ASSIGNOR OF ONE-HALF TO THE FIRM OF C. NEFF, OF HANOVER, GERMANY.

TREATMENT OF LIQUIDS.

13,338. Specification of Reissued Letters Patent. Reissued Dec. 12, 1911.

Original No. 904,114, dated November 17, 1908, Serial No. 382,389. Application for reissue filed May 31, 1910. Serial No. 564,334.

*To all whom it may concern:*

Be it known that I, AUGUST BRANDES, a subject of the German Emperor, residing at 8[11] Hildesheimerstrasse, Hanover, Germany, have invented certain new and useful Improvements Relating to the Treatment of Liquids, of which the following is a specification.

This invention relates to the treatment of liquids and has for its object to impart special properties thereto, and with respect to water to soften it and to impart other qualities to it. It makes use of certain forces or properties stored in or possessed by certain metals such as aluminium, or metals having the liquid affecting properties of aluminium, those forces or properties being brought into action to affect the character of a liquid by the process of treatment described below. The action seems to be physico-chemical, and I have as yet been unable to determine definitely the scientific principles involved in the operation, but I do know that hard water is rendered soft by the treatment and that water and other liquids have imparted to them other valuable and remarkable characteristics that I am unable to fully explain.

I have found that when water containing salts such as are usually found in spring and river water is allowed to flow in a thin stream over aluminium the water has properties imparted to it that render it especially useful for washing linen, wool, cotton, flax, and other substances and for other purposes for which soft water is desirable, such as for feeding steam generators; while other properties are imparted to it whereby for example, when used for watering plants a stronger growth of leaves and branches results and the show of flowers in flower bearing plants is richer and the bloom lasts longer than when untreated water is used for that purpose.

In carrying out this process I have found that to secure the best results the surface of the metal should be kept free from accumulations so that the liquid will flow in contact with the bare surface and that the liquid should flow in a thin stream over an extensive surface of metal, the stream being exposed to the air in its passage. The speed at which the stream passes over the metal surface should furthermore be as great as that at which water will flow by gravity down a practically vertical surface. In other words, it should be rapid. The desired action may furthermore be assisted by exposure to the light since the rays such as are contained in sun-light seem to be absorbed by the metal.

While I am unable to indicate with certainty the exact scientific causes for the results which my process produces there are certain phenomena during the operation which have been observed by experiment which may offer some explanation. When the water passes in a thin stream over the metal it is aerated and at the same time a portion of its free and combined carbonic acid, such as dissolved bicarbonates of calcium and magnesium, are eliminated and the water shows an alkaline reaction.

While I have found that aluminium is a particularly satisfactory metal to use, my invention is not limited to that metal, since other metals may be used with good results particularly other electro-positive metals. When the process is applied to other liquids besides water special qualities or characteristics are imparted to them according to their character; for example, milk when treated can be kept longer than untreated milk without turning sour.

In the accompanying drawing I have shown an apparatus which may be used in carrying out my process.

This apparatus comprises a standard *a* supporting the metal *b*—for example, vertical strips or plates of corrugated aluminium. The upper orifice *c* for the introduction of the liquid is funicular and contains a distributer *d*, whereby the liquid will quickly pass by gravity down over the metal plates in a thin uniform stream.

The apparatus may be modified in various ways according to the particular purpose in view, and it may be constructed for household use or for treating liquid on a commercial scale. The liquid may be made to flow through the apparatus repeatedly or only once according to the purpose for which it is required. Individual tests may be made to ascertain the strength of the properties acquired by the liquid after its passage through the apparatus any given number of times.

Repeated tests have proved that water treated as described is capable of cleansing even the most soiled linen and the like in a very short space of time. The linen may for this purpose be placed in the treated water with the addition of a few grams of oil soap and boiled for 25 or 30 minutes, whereupon it is rinsed and hung up to dry. By this means the linen is thoroughly cleansed and bleached, whereas if ordinary water be used a much more lengthy time for the washing process is required.

It will thus be understood that by treatment according to the invention special qualities are imparted to water, for not only is the water softened, but when treated water is used for boiler feeding no corrosion results nor scale, and when used to wash linen and other goods the washing is more effectively performed and a bleaching effect on the goods secured. Moreover, when using such treated water for horticultural and agricultural purposes, where the ground has been saturated with the water, the plants become much stronger, the flowers have more buds and blossoms, and the blossoms remain longer; similarly the water has been found useful for the many purposes for which the use of soft water is desirable, such as preventing sliming in the treatment of ores and for hygienic and culinary purposes.

What I do claim as my invention and desire to secure by Letters Patent is:

1. A method of treating a liquid which consists in causing the liquid to pass rapidly in a thin stream in contact with a bare surface of metal having the liquid affecting properties of aluminium.

2. A method of treating a liquid which consists in causing the liquid to pass rapidly in a thin stream in contact with a bare surface of aluminium.

3. A method of treating a liquid which consists in subjecting metal having the liquid affecting properties of aluminium to the action of rays such as are contained in sunlight and in causing the liquid to pass in contact with the bare surface of said metal until the characteristics of the liquid are changed.

4. A method of treating water which consists in causing the water to pass rapidly in a thin stream in contact with an extensive surface of aluminium while exposed to the atmosphere until the characteristics of the water are changed.

5. A method of treating a liquid which consists in subjecting a metal having the liquid affecting properties of aluminium to the action of rays such as are contained in suplight, and causing the liquid to pass rapidly in a thin stream in contact with the bare surface of said metal while exposed to the atmosphere.

6. A method of treating a liquid which consists in subjecting a metal having the liquid affecting properties of aluminium to the action of rays such as are contained in sunlight, and causing the liquid to pass rapidly in a thin uniform stream in contact with an extensive bare surface of said metal while exposed to the atmosphere.

7. An improved method of treating a liquid consisting in passing the liquid in a thin stream over the surface of metal exposed to the action of light until its characteristics have changed, said metal having the liquid affecting properties of aluminium.

8. An improved method of treating a liquid consisting in passing the liquid in a thin stream over the surface of aluminium exposed to the action of light until its characteristics have changed.

9. The method which consists in causing water to flow over aluminium which is exposed to light.

10. An improved method of softening water, consisting in passing the water in a thin stream over the surface of an electro-positive metal exposed to the action of light until the water shows an alkaline reaction.

11. An improved method of softening water, consisting in exposing a metal to the action of rays such as are embodied in sunlight, and passing the water in a thin stream over the surface of said metal.

12. An improved method of softening spring and river water, consisting in passing the water in a thin stream over the surface of aluminium exposed to the action of light, until the water shows an alkaline reaction.

13. The method of treating a liquid which consists in passing the liquid in a stream over a substantially vertical surface of metal having the liquid affecting properties of aluminium until the characteristics of the liquid are changed.

14. The method of treating water which consists in passing the water in a stream over a vertically corrugated aluminium surface until the characteristics of the water are changed.

15. A method of treating water, which consists in causing it to pass rapidly in contact with a bare surface of aluminium until its characteristics have changed.

In testimony whereof I have hereunto signed my name to this specification in the presence of two subscribing witnesses.

AUGUST BRANDES.

Witnesses:

FR. KÜPLIN,

OSKAR WAGSBERG.